United States Patent [19]

Bereiter

[11] 4,386,882
[45] Jun. 7, 1983

[54] SELF-DRILLING ANCHOR DOWEL

[75] Inventor: Rolf Bereiter, Buchs, Switzerland

[73] Assignee: Hilti Aktiengesellschaft, Schaan, Liechtenstein

[21] Appl. No.: 241,389

[22] Filed: Mar. 6, 1981

[30] Foreign Application Priority Data

Mar. 11, 1980 [DE] Fed. Rep. of Germany ....... 3009312

[51] Int. Cl.³ .............................................. F16B 35/00
[52] U.S. Cl. .................................... 411/387; 411/29; 411/82; 411/107
[58] Field of Search ............... 411/387, 107, 103, 176, 411/180, 388, 29, 166, 5, 3, 15, 82, 30, 31; 405/259, 260; 408/226

[56] References Cited

U.S. PATENT DOCUMENTS

| 1,379,209 | 5/1921 | Phillips | 411/29 |
| 1,449,625 | 3/1923 | Phillips | 411/29 |

FOREIGN PATENT DOCUMENTS

| 457045 | 7/1968 | Switzerland | 411/29 |
| 137744 | 1/1920 | United Kingdom | 411/387 |
| 1232185 | 5/1971 | United Kingdom | 411/29 |

*Primary Examiner*—Ramon S. Britts
*Attorney, Agent, or Firm*—Toren, McGeady and Stanger

[57] ABSTRACT

A self-drilling anchor dowel has a drill head at one end of the axially elongated dowel and a truncated cone-shaped projection at the other end. The projection fits into an adapter or holder on a drilling device. Immediately following the drill head is a frusto-conical clamping part which tapers inwardly in the direction away from the head. A collar extends laterally outwardly from the smaller diameter end of the clamping part. The outside diameter of the collar is the same as the outside diameter of the drill head. When the dowel is drilled into a receiving material, such as concrete or rock, and the collar enters the borehole formed by the dowel, the collar prevents the borings formed in the drilling operation from being discharged out of the borehole. As the collar continues into the borehole, it compacts the borings which anchor the dowel in the borehole.

8 Claims, 3 Drawing Figures

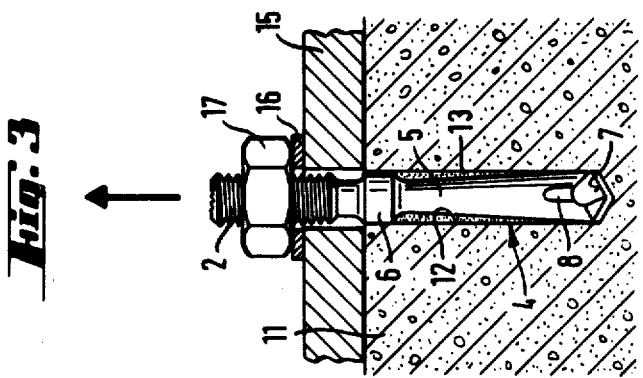
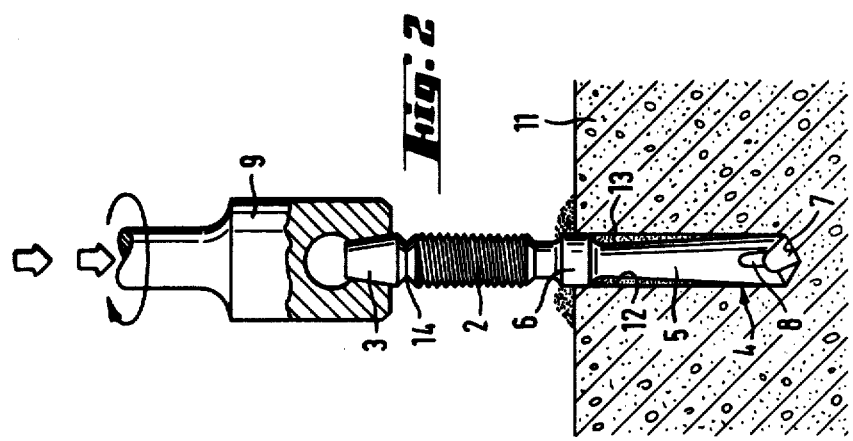
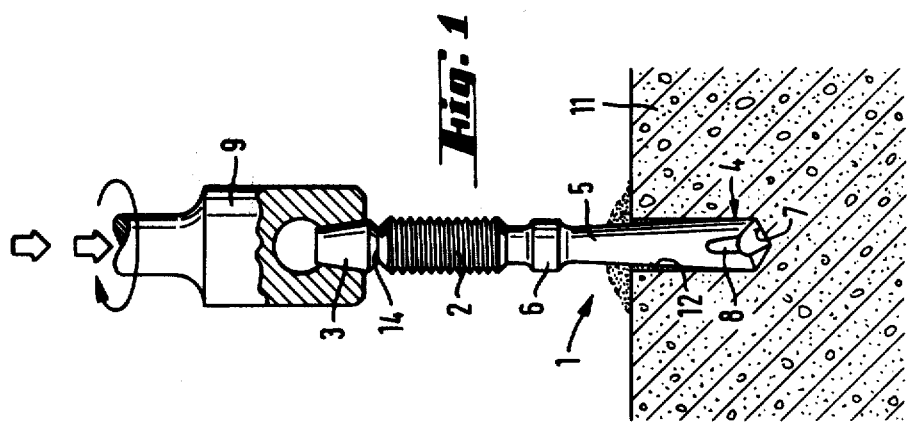

SELF-DRILLING ANCHOR DOWEL

SUMMARY OF THE INVENTION

The present invention is directed to a self-drilling anchor dowel including a drill head at its leading end, that is the end first inserted against the receiving material for forming a borehole, followed by a frusto-conically shaped clamping part which tapers inwardly in the direction away from the drill head.

Conventional self-drilling anchor dowels which usually are anchored in concrete or rock, are comprised of an anchoring member in the form of a sheath or a tie rod which has a drill head formed integrally on its leading end or the drill head is attached at the leading end. After the dowel is drilled into the receiving material by imparting percussion to the anchoring member as well as rotating it, the anchoring member is spread in the borehole which it formed. A spreading element in the form of a truncated cone inserted into the dowel or the mentioned cutting edge which is driven into an axial slot in the tie rod, serve to anchor the dowel in the borehole. Only percussive force is directed against the spreading element or the anchor member for effecting the spreading or anchoring process.

There are considerable disadvantages involved in such dowels, for instance, the dowel is made up of many parts and the anchoring operation is involved. As an example, when the anchoring member is in the form of a sheath, it is necessary to drill the borehole with the relatively large transverse section resulting in a long drilling time. Furthermore, the setting or anchoring process is also time-consuming because the drilling and anchoring steps take place in separate work cycles. Moreover, a setting device which can be switched from one operating function to another is needed, because the drilling step requires both rotational and percussive forces, however, the spreading or anchoring step is effected only by percussive force. A significant functional disadvantage of such dowels is that they do not show any spreading effect under stress.

Self-drilling dowels for use with a support in mining are known and include an anchoring member for attachment into the receiving material with a shaft portion adjoining the anchoring member. The anchoring member is made up of a drill head with cutting edges at its leading end and a feed coil for removing the borings, as well as an adjoining clamping part which tapers conically inwardly toward the trailing end of the dowel.

To set such dowels, they are driven into the receiving material by a rotary motion with the borings formed as a part of the drilling operation passing from the cutting edges via the feed coil into the region of the clamping part. If the drilling direction is horizontal or vertically downwardly, then the borings remain between the dowel surface and the wall of the borehole. The borings are discharged out of the borehole when there is no longer any room remaining between the dowel and the walls of the borehole. When the entire anchoring member has penetrated into the receiving material, the dowel is rotated in the reverse direction. This reverse motion causes the borings to be compressed between the frusto-conical clamping part and the wall of the borehole so that the dowel is anchored. Due to axial stressing, the dowel causes a continued compression of the borings in the region of the clamping part so that the anchoring valve of the dowel is further increased.

A significant disadvantage of this known self-drilling anchor dowel is that it cannot be used in the vertically upward direction because the borings, after passage through the feed coil, fall out of the borehole and anchoring the dowel, by compressing the borings in the region of the clamping part, is not possible. Another disadvantage of this type of dowel is that when the direction is reversed, an insufficient compression of the borings in the clamping part is accomplished. Only after there is considerable axial shifting as a result of axial stress, do the borings compress sufficiently along the clamping part to afford a useful anchoring valve. Therefore, this self-drilling dowel has problems concerning the anchoring safety.

Therefore, it is the primary object of the present invention to provide a simple and universally settable self-drilling anchor dowel which is notable for the small drilling effort required, for the high anchoring values attained, for the high anchorage safety, and the respreading effect which can be achieved.

In accordance with the present invention, at the smaller diameter end of the frusto-conically shaped clamping part, a circular collar extends around the dowel and, when it is present in the borehole formed by the dowel, effects a compressing action on the borings within the borehole. This collar has an outside diameter corresponding to the outside diameter of the drill head so that it forms a closure for the borehole.

The self-drilling dowel embodying the present invention is suitable for use in receiving materials such as concrete or rock. It can be provided with an external or an internal thread rearwardly of the collar. To fit the dowel into the adapter or tool holder of a drilling device, it can be provided with a projection in the form of a truncated cone at its rear or trailing end. A breaking section can be provided at the connection between the projection and the remainder of the dowel. The breaking section affords a separation of the projection when a predetermined torque is developed.

The self-drilling dowel is set by means of a percussion drill with the drill head cutting a borehole into the receiving material. During the drilling operation, the borings or material, removed from the receiving material in forming the borehole, pass from the drill head into the region of the frusto-conical clamping part with a large amount of the borings flowing out of the borehole opening. As the drilling operation continues, the collar which can be constructed in the form of a superimposed ring, reaches the borehole opening and provides a closure for the borehole. Any borings remaining within the borehole or subsequently removed by the drill head are confined in the closed space between the clamping part and the borehole wall. As the collar continues to move into the borehole it compresses the captive borings. With an increasing degree of compression acting on the borings, the cutting power transmitted to the drill head is reduced with the entire percussive energy being used to compress the enclosed borings as the dowel continues to rotate. As the collar starts to move into the borehole, the borings commence being compacted into a solidly compressed body.

Due to the smooth surface of the clamping part, the contact surface of the borings with the clamping part becomes equally smooth during the compression process with the friction between the dowel and the body of borings being smaller than the static friction between the body of borings and the borehole wall. As a consequence, the body of borings does not rotate with the dowel as the dowel is being set. Nevertheless, as the compression of the borings increases, an increasing torque is developed on the dowel. If a projection, connected with the dowel over the predetermined breaking section, is present at the trailing end, this increasing torque may result in the breaking off of the projection from the dowel. In an appropriately constructed design of such a predetermined breaking section, the breaking moment acting on the dowel may serve as an indicator that a sufficient precompression of the borings has been achieved in the region around the clamping part.

During subsequent stressing of the self-drilling dowel, the dowel is pulled out of the borehole by a small axial distance, and the frusto-conical shape of the clamping part tends to provide additional compression on the body of the borings with a consequent increase in the dowel anchoring value. It is of great importance in this subsequent compressing action that the smooth surface contact between the clamping part and the body of borings is such that relative axial displacement is possible. During this respreading action, the collar remains within the borehole so that there is no possibility of escape for any portion of the body of borings.

It is particularly important in the selection of the cone angle or angle of taper of the clamping part, that the angle lies in the irreversible range, with the angle being in the range of 1° to 10°, preferably 2° to 6° for the above mentioned receiving material.

To effect the anchoring of the dowel with a limited amount of drilling, it is advantageous if the anchoring member is constructed as short as possible. In accordance with this feature of the invention, the clamping part follows immediately after the drill head. When the dowel is being set in softer receiving materials, such as low strength concrete, a deeper insertion of the dowel may be necessary so that an axially extending cylindrical region of appropriate length is provided between the trailing end of the clamping part and the collar.

In accordance with another feature of the invention, the drill head has channels for conducting the borings in the rearward direction. Such channels are essentially axially directed and extend into the leading end of the clamping part. Accordingly, the transport of the borings from the drill head into the region of the clamping part is aided and the drilling operation is improved. As long as these channels do not weaken the outlet cross-section of the drill head by more than 20°, it is ensured that the drill head is supported sufficiently at the body of borings in the case of stress. For the sake of simplicity, the channels can be formed as flat areas or as helically extending slots or grooves.

A further increase in the anchoring value of these dowels can be attained if, based on another feature of the invention, the clamping part is coated with an adhesive activated by pressure or heat. Activation of the adhesive results during the compression phase of the setting process, so that in addition to the mechanical anchorage of the dowel effected by the body of borings, a chemical anchorage is achieved by means of adhering the dowel or the body of borings with the borehole wall.

If the dowel is not coated with adhesive, it is also possible as a simple measure to introduce water into the borehole during the setting process so that the residual amounts of not reacted cement, present in the borings, can be utilized and lead to the subsequent chemical hardening of the body of borings. In place of water, an adhesive may be introduced into the borehole which causes the body of borings to set.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view partly in section of a self-drilling anchor dowel, embodying the present invention being drilled into a receiving material;

FIG. 2 is an elevational view, similar to FIG. 1, with the dowel inserted into the receiving material for a sufficient axial length so that the compression stage is commenced; and FIG. 3 is an elevational view similar to FIGS. 1 and 2 showing the self-drilling anchor dowel fully inserted into the receiving material and being stressed by an applied force.

DETAIL DESCRIPTION OF THE INVENTION

In the drawing a self-drilling anchor dowel is shown as it is being inserted into a receiving material 11, such as concrete, and when it has been completely inserted and anchored for securing an object 15 on the surface of the receiving material. As shown in FIG. 1, self-drilling anchor dowel comprises an axially elongated anchoring member 1 having a leading end and a trailing end with the leading end being inserted first against the receiving material 11 so that it commences forming a borehole 12. Adjacent the trailing end of the anchoring member 1 is an axially extending threaded stem 2 with a truncated cone-shaped projection 3 extending axially from the trailing end of the threaded stem. At its leading end, the anchoring member has a drill head 4 followed by an axially extending clamping part 5. Clamping part 5 is frusto-conically shaped with its surfaces tapering inwardly in the direction toward the trailing end of the anchoring member. At the smaller diameter end of the clamping part, a collar 6 extends around the anchoring member projecting laterally outwardly from the smaller diameter end of the clamping part. At the leading end of the anchoring member, cutting edges 7 are ground on the drill head 4 and axially extending conducting channels are formed rearwardly from the cutting edges in the form of grooves 8 for carrying the borings formed during the drilling operation away from the drill head and out of the borehole 12. As can be seen in the drawing, the grooves 8 extend for a short distance from the drill head 4 along the outside surface of the clamping part 5.

During the first portion of the drilling operation, as shown in FIG. 1, both rotational and percussive driving force are transmitted to the self-drilling dowel, note the direction of the arrows in FIGS. 1 and 2 indicating the driving force transmitted from a drilling device, not shown, to the anchoring member 1. The projection 3 on the trailing end of the dowel is fitted into an adapter 9 of the drilling device, not shown. The projection is held within the adapter 9 so that both the rotational and percussive forces are transmitted to the anchoring member 1. As the drilling operation proceeds, the cutting edges 7 on the drill head 4 cut a borehole 12 into the receiving material 11 from its surface. The borings, that is the material removed from the receiving material by the cutting head in forming the borehole, are conveyed away from the drill head 4 via the grooves 8 into the open space in the borehole between its wall and the juxtaposed surface of the clamping part 5. As the drill head 4 cuts into the receiving material, the borings are forced out of the borehole 12, note the borings on the surface of the receiving material in FIG. 1.

After the drilling operation has advanced for the axial length of the drill head 4 and the clamping part 5, the collar 6 reaches the surface of the receiving material and starts to enter the opening into the borehole 12, note FIG. 2. The outside diameter of the collar 6 is the same as the outside diameter of the drill head 4 so that the collar 6 forms a closure for the opening into the borehole 12. As a result, the borings can no longer be displaced out of the borehole and they are retained in the axial region of the clamping part between the frusto-conically-tapering surface of the clamping part and the wall of the borehole 12. The enclosed borings are compressed as the collar 6 advances into the borehole during the continued advance of the self-drilling dowel into the receiving material under both rotational and percussive force. During the continued drilling operation, the drill head 4 continues to produce more borings. With the increasing compaction or density of the borings, however, the continued movement of the dowel into the receiving material is hindered causing a decrease in the drilling power with the percussive force transmitted to the self-drilling dowel finally only serving to compress the borings held within the borehole 12. Accordingly, a solid, essentially tubular shaped body of borings 13 forms in the borehole causing a jamming or anchoring of the clamping part 5. A predetermined breaking section 14 is provided toward the trailing end of the dowel between the threaded stem 2 and the projection 3. This breaking section 14 has a predetermined breaking point so that when the tubular body of borings 13 seizes the clamping part in the anchoring action, a torque is developed which causes the predetermined breaking section to rupture separating the projection 3 from the remainder of the dowel. At this point, the self-drilling dowel is set in the position as shown in FIG. 3.

In FIG. 3, the self-drilling dowel is shown with the projection 3 removed and the clamping part 5 anchored within the borehole 12 by the compacted body of borings 13. An object 15 is fitted over the portion of the anchoring member extending out of the receiving material and it is secured by a disc 16 and a nut 17. As the nut 17 is tightened, the self-drilling dowel is pulled slightly in the direction of the arrow in FIG. 3. Because of the tapered configuration of the clamping part 5, this tendency to pull the dowel out of the borehole 12 provides further compression of the body of borings 13, whereby the anchoring value of the dowel in the receiving material 11 is increased. In this way anchoring forces are uniformly transferred from the clamping part 5 over the compacted solid body of borings 13 to a large area of the borehole wall, that is, no partial pressure peaks result. Furthermore, when the force indicated by the arrow in FIG. 3 tends to pull the dowel out of the borehole, the collar 6 continues to form a closure of the borehole 12 so that the body of borings 13 cannot be displaced out of the borehole either partially or as a whole.

By mixing water or an adhesive before or during the compression stage illustrated in FIG. 2, a chemical hardening effect can be added to the body of borings 13. As a result, there is a combined mechanical and chemical holding action securing the dowel. Further, this effect can also be achieved if the clamping part 5 is coated with an adhesive which can be activated by pressure or heat during the drilling operation.

While specific embodiments of the invention have been shown and described in detail to illustrate the application of the inventive principles, it will be understood that the invention may be embodied otherwise without departing from such principles.

I claim:

1. Self-drilling dowel comprising an axially elongated anchoring member having a first leading end and a second trailing end with the first end being placed against the receiving material so that the dowel can form a borehole into the receiving material, a drilling head formed at the first end of said anchoring member and attaching means formed at the second end thereof, an axially extending clamping part extending between said first end and second end with the clamping part being frusto-conically shaped and tapering inwardly toward the second end, a circumferentially uninterrupted circular collar fixedly formed between the smaller diameter end of said clamping part and the second end of said anchoring member said circular collar projecting laterally outwardly from the small diameter end of the clamping part, and said collar having an outside diameter corresponding to the outside diameter of said drill head whereby said collar has an outside diameter substantially the same as the diameter of the borehole formed by said drill head.

2. Self-drilling dowel, as set forth in claim 1, wherein the angle of taper of the frusto-conically shaped clamping part is in the range of 1° to 10°.

3. Self-drilling dowel, as set forth in claim 2, wherein the angle of taper of said clamping part is in the range of 2° to 6°.

4. Self-drilling dowel, as set forth in claim 1, 2 or 3, wherein said clamping part extends from said drill head toward the second end of said anchoring member.

5. Self-drilling dowel, as set forth in claim 4, wherein substantially axially extending grooves being formed in said drill head and extending therefrom into the adjacent end of said clamping part for conducting borings cut by said drill head in the borehole toward the second end of said anchoring member.

6. Self-drilling dowel, as set forth in claim 1, wherein an adhesive being coated on the outside surface of said clamping part, said adhesive being activatable by pressure or heat so that it mixes with the borings formed in the drilling operation.

7. Self-drilling dowel, as set forth in claim 1, wherein said clamping part extends from said drill head toward the second end of said anchoring member, said circular collar being located at the smaller diameter end of said clamping part, the attaching means comprising an axially extending threaded section located between said collar and the second end of said anchoring member, a frusto-conically shaped projection froming the second end of said anchoring member with said projection being shaped to fit into an adapter for a drilling device.

8. Self-drilling dowel, as set forth in claim 7, wherein a predetermined breaking section interconnecting said projection and the end of said threaded section so that said projection separates from said anchoring member when a certain torque is developed as the self-drilling dowel is drilled into a receiving material.

* * * * *